March 7, 1967 R. J. VAN DE GRAAFF 3,308,323
INCLINED-FIELD HIGH-VOLTAGE VACUUM TUBES
Filed May 25, 1961 11 Sheets-Sheet 6
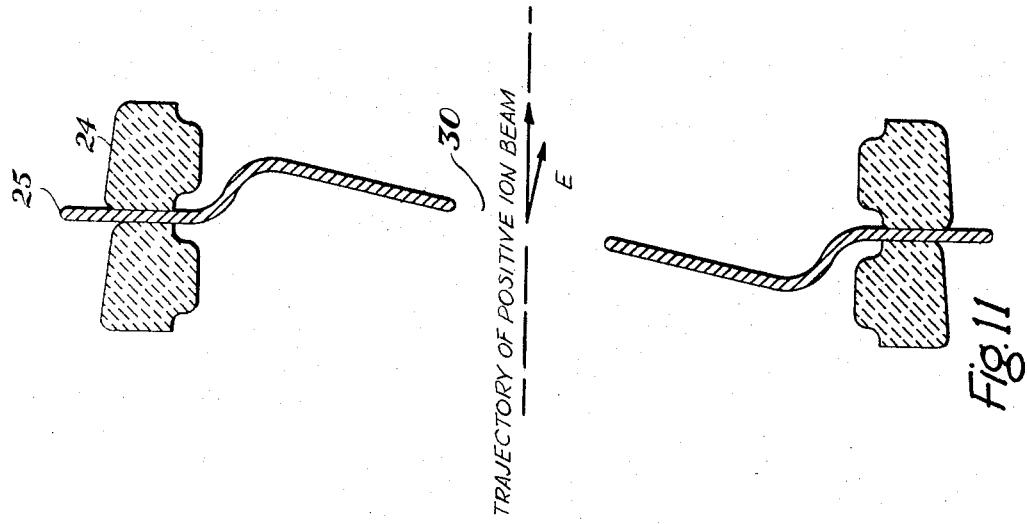
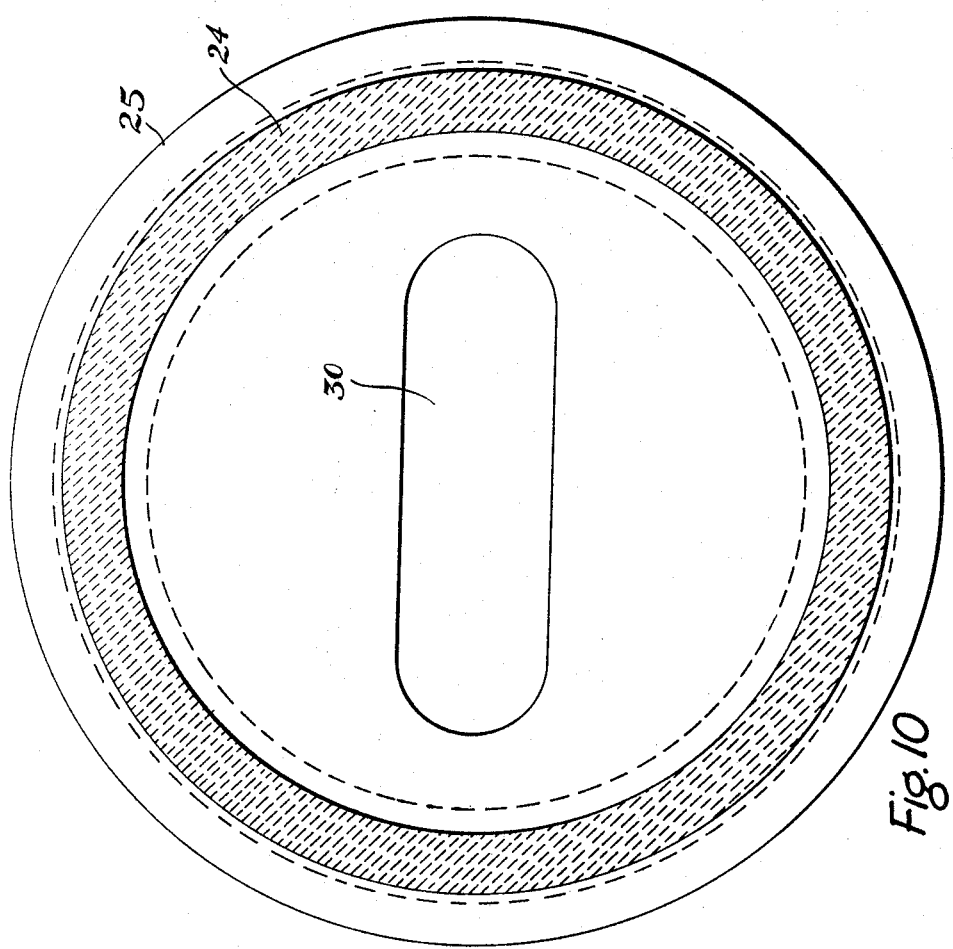

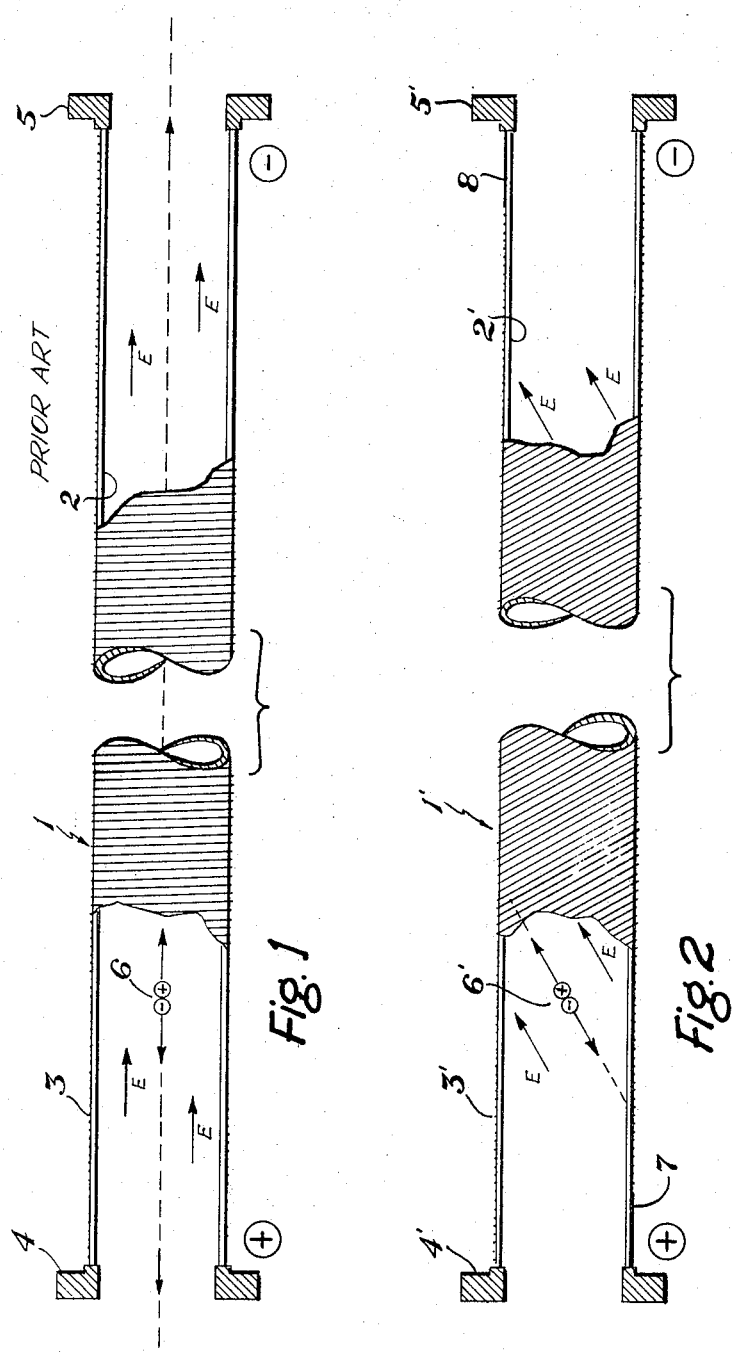

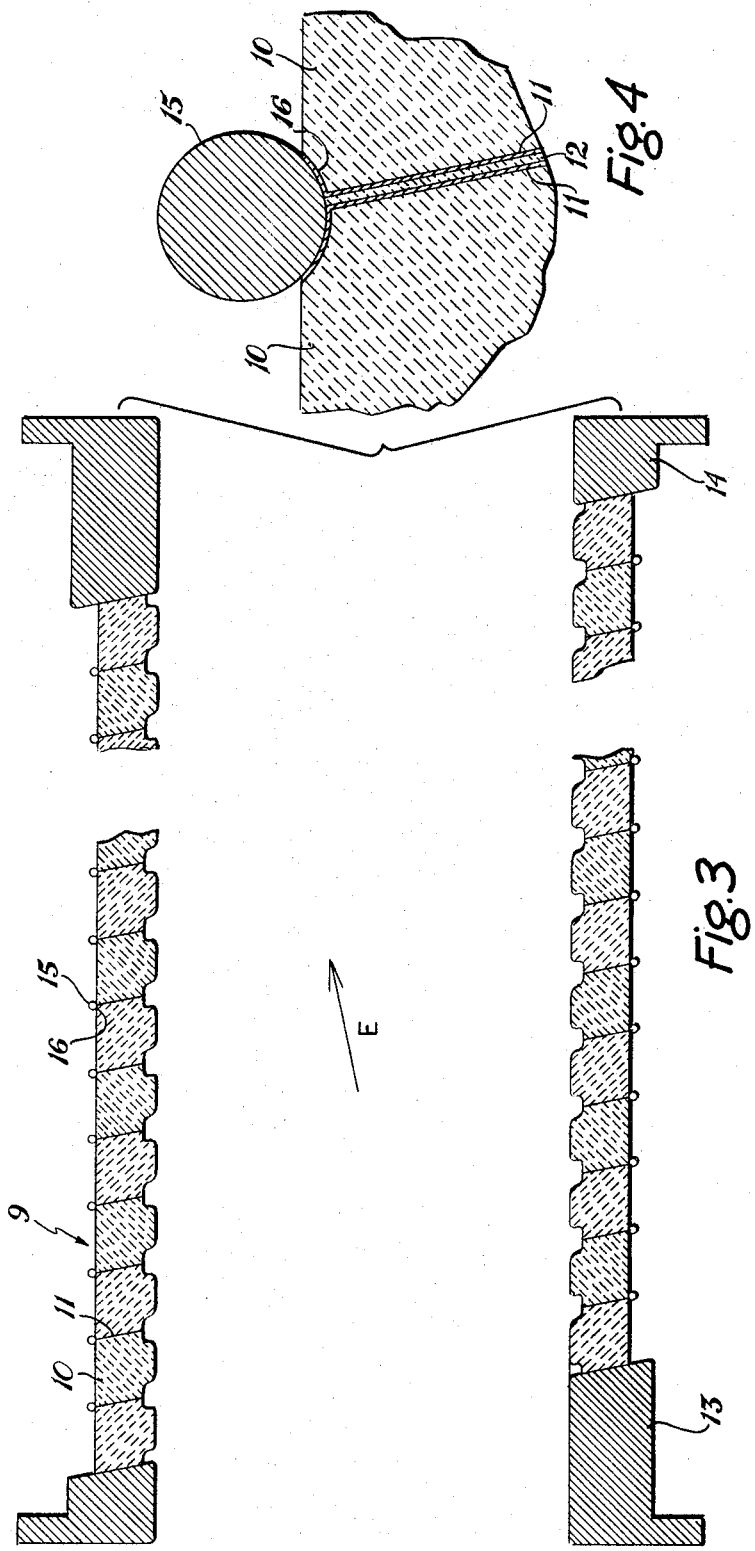

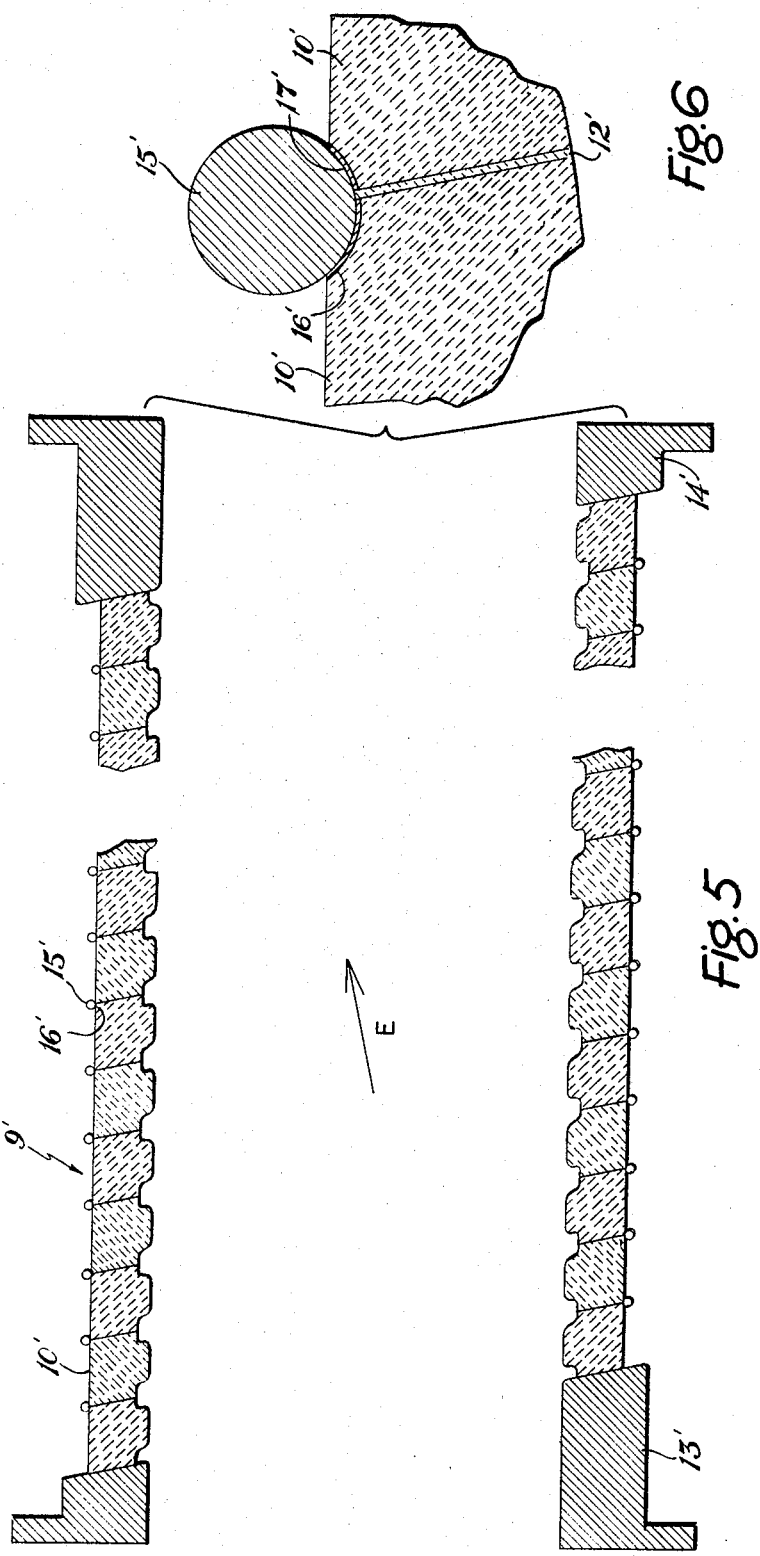

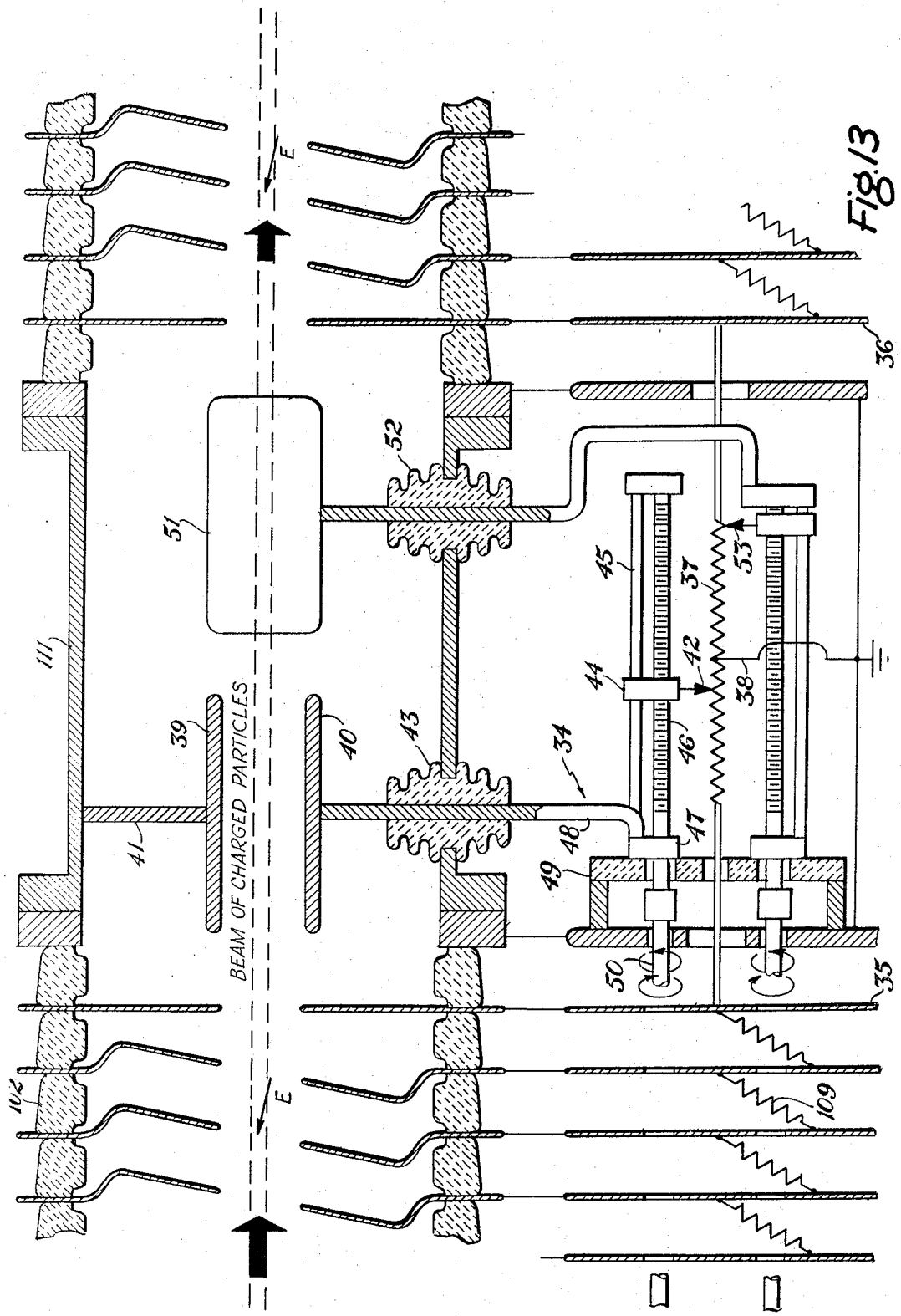

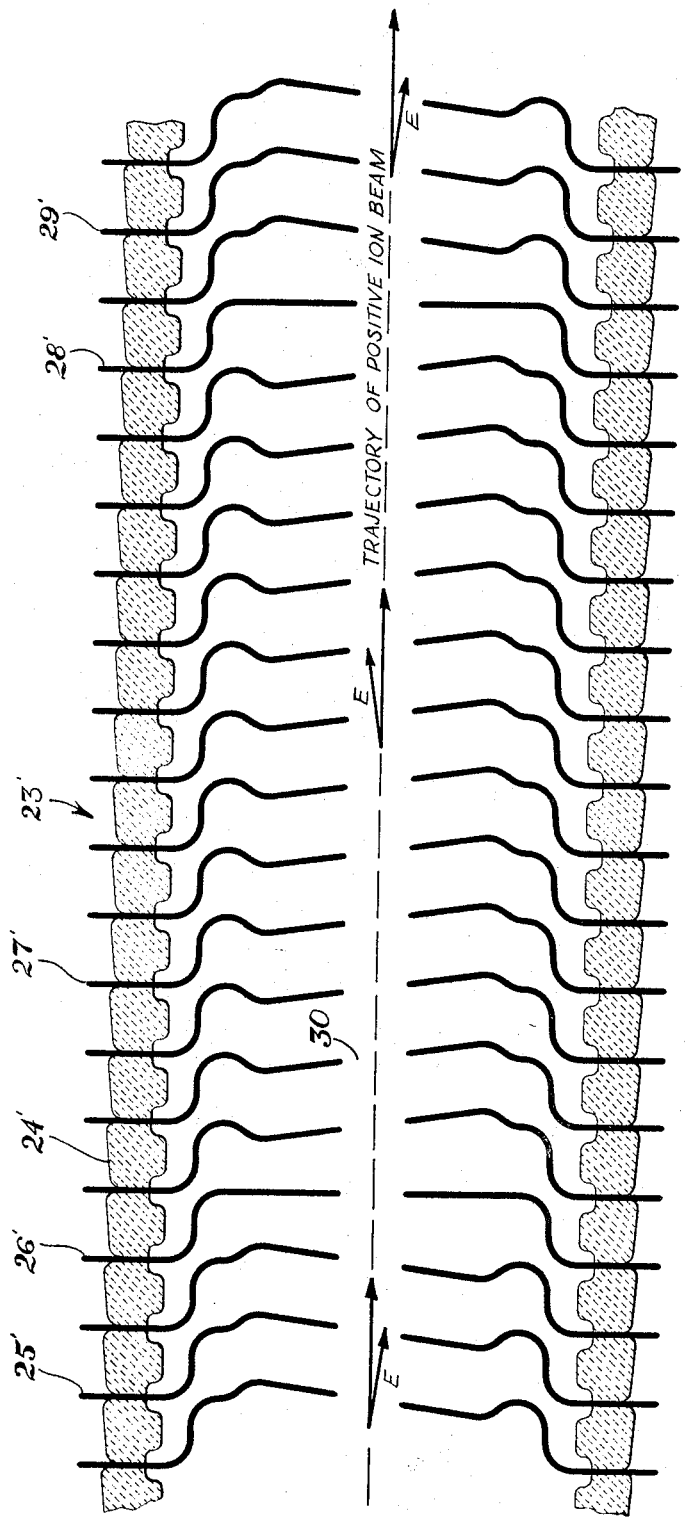

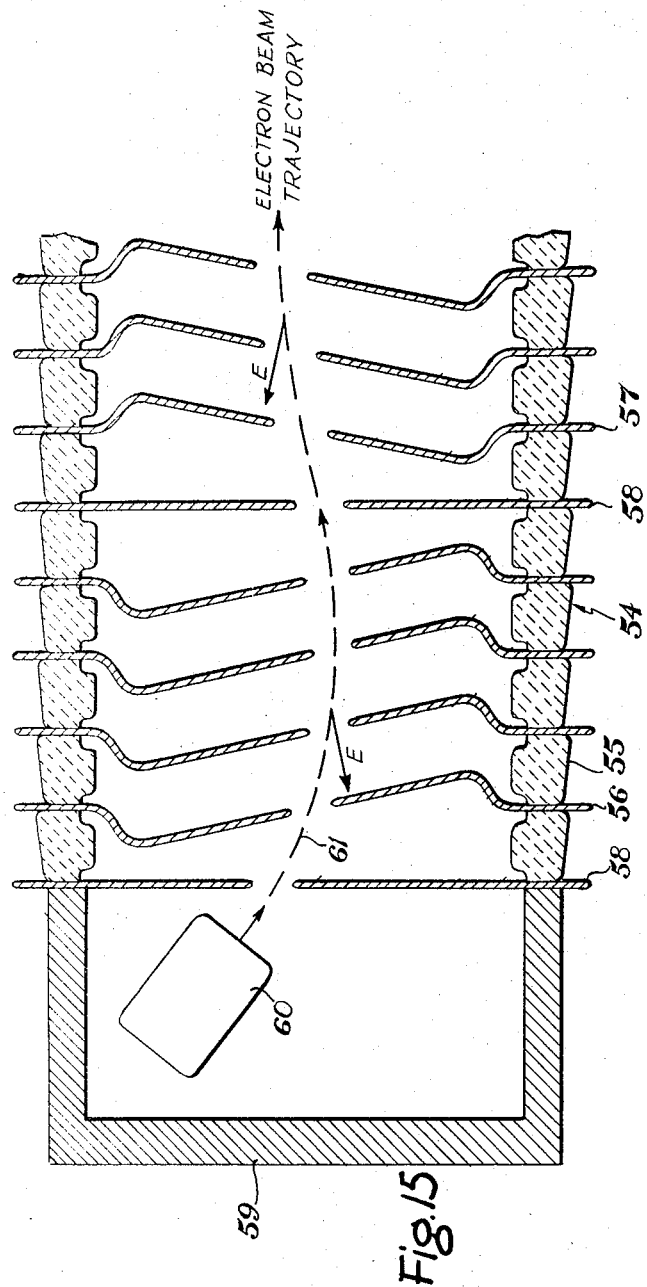
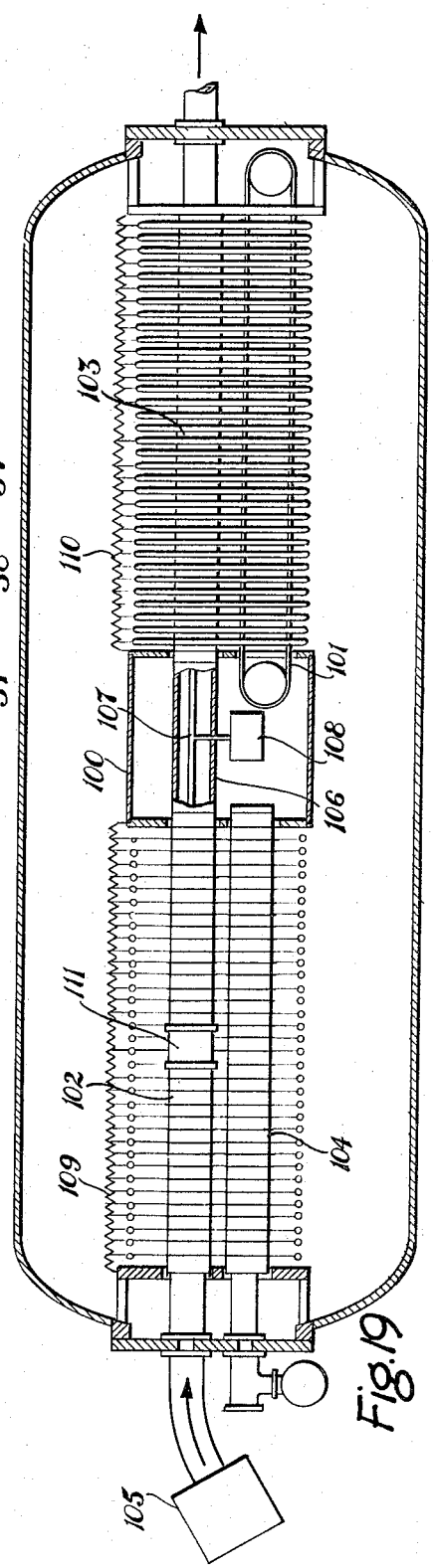

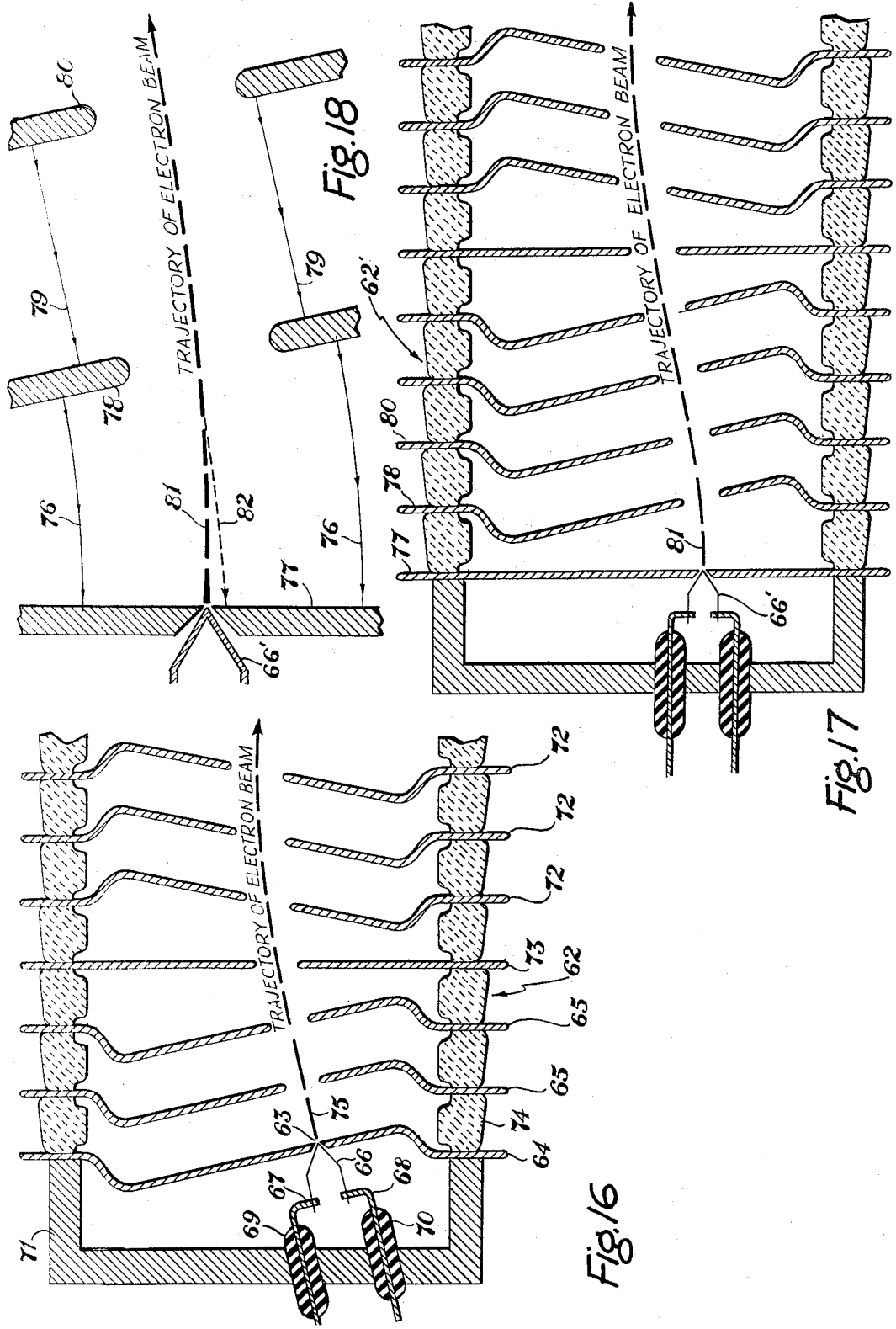

United States Patent Office 3,308,323
Patented Mar. 7, 1967

3,308,323
INCLINED-FIELD HIGH-VOLTAGE VACUUM TUBES
Robert J. Van de Graaff, Lexington, Mass., assignor to High Voltage Engineering Corporation, Burlington, Mass., a corporation of Massachusetts
Filed May 25, 1961, Ser. No. 112,674
14 Claims. (Cl. 313—63)

This invention relates to high-voltage evacuated tubes in which the so-called "total voltage" effect is reduced and indeed may be eliminated. The invention includes tubes for three main purposes: tubes for differential pumping, tubes in which beams of neutral particles traverse a high-voltage potential difference, and finally high-voltage acceleration tubes, in which charged particles are accelerated to high velocity.

When Roentgen originally discovered the phenomenon of X-rays, he soon perceived that by increasing the total voltage across the acceleration tube, one could greatly reduce the exposure time required to make a radiograph through an object of medium thickness. But he found that when he tried to increase the voltage beyond a certain point the tube broke down electrically and prevented further increase in voltage. This limitation is imposed by the total voltage across an evacuated tube and is a phenomenon distinct from ordinary insulation problems which impose a limit on the voltage gradient obtainable along the tube. Thus although a tube designed for operation at 1 million volts may work satisfactorily, a tube twice as long will not necessarily work satisfactorily at 2 million volts even though the voltage gradient is the same in both cases. The additional limitation is called the "total voltage" effect and is caused by secondary charged particles which are produced within the tube by various causes, such as cosmic rays, the primary beam, field emission, or other events, which in turn may produce ionization of the residual gas therein or bombardment of the surfaces within the tube. Ever since Roentgen's original discovery, workers in the field of high voltage have striven towards the elimination of the total voltage effect, but prior to this invention no general solution of the problem has appeared.

In accordance with the invention, a high-voltage vacuum tube is so constructed that the electric lines of force therein are substantially shorter than the insulating length of the tube. In the particular case of a high-voltage acceleration tube, in accordance with the invention, a high-voltage acceleration tube is so constructed as to give kinetic energy to the beam in the desired direction while giving kinetic energy to the secondaries in a different direction. In the acceleration tubes constructed in accordance with the prior art teachings, an accelerating field is applied to the beam particles in the direction desired for acceleration but at the same time kinetic energy is also given to secondaries in the same direction, thus affording opportunity for the building up of the total voltage effect. Stated somewhat differently, the invention comprehends an acceleration tube across the ends of which high-voltage power is applied and through which a charged particle beam can pass and be given kinetic energy corresponding to the full voltage across the length of the tube, whereas in general the kinetic energy imparted to secondary particles produced is limited to that corresponding to the voltage across only a certain small length of the tube, so that only a small fraction of the energy corresponding to the total voltage is given to the secondaries. Since with increased length of the tube the amount of kinetic energy imparted to the secondaries is still only the same as that imparted over the small fixed length, no total voltage limit is encountered, and the total voltage of the tube can thus be increased indefinitely and proportionately by increasing the length of the tube.

The invention may best be understood from the following detailed description thereof having reference to the accompanying drawings in which:

FIG. 1 is a side view, partly in longitudinal central section, of a high-voltage vacuum tube constructed in accordance with certain teachings of the prior art;

FIG. 2 is a view similar to that of FIG. 1 showing a high-voltage vacuum tube of the type shown in FIG. 1, but modified in accordance with the invention;

FIG. 3 is a longitudinal central section through a high-voltage vacuum tube constructed in accordance with the invention and suitable for use as a differential-pumping tube;

FIG. 4 is a detail on an enlarged scale of a portion of the vacuum tube of FIG. 3;

FIG. 5 is a view similar to that of FIG. 3 showing a modification of the vacuum tube of FIG. 3;

FIG. 6 is a detail on an enlarged scale of a portion of the vacuum tube of FIG. 5;

FIG. 10 is a transverse section, on an enlarged scale, through the acceleration tube of FIG. 9;

FIG. 11 is a longitudinal central section through a short portion of the length of the acceleration tube shown in FIGS. 9 and 10, being similar to the sectional view of FIG. 9 but to the scale of FIG. 10;

FIG. 13 is a view similar to that of FIG. 9 and showing beam-steering apparatus which forms a part of the invention;

FIG. 14 is a view similar to that of FIG. 9 showing an alternative embodiment of the invention;

FIG. 15 is a view similar to that of FIG. 12 and showing that extremity of the acceleration tube of FIGS. 9 through 11 into which charged particles are injected, together with low-velocity injection apparatus;

FIG. 16 is a view similar to that of FIG. 15 and showing a modification of the injection apparatus of FIG. 15;

FIG. 17 is a view similar to that of FIG. 15 and showing another modification of the injection apparatus of FIG. 15;

FIG. 18 is a detail showing a portion of the apparatus of FIG. 17 on an enlarged scale; and FIG. 19 is a diagrammatic view in longitudinal central section of one type of particle accelerator having incorporated therein vacuum tubes embodying the invention.

Figure 7:
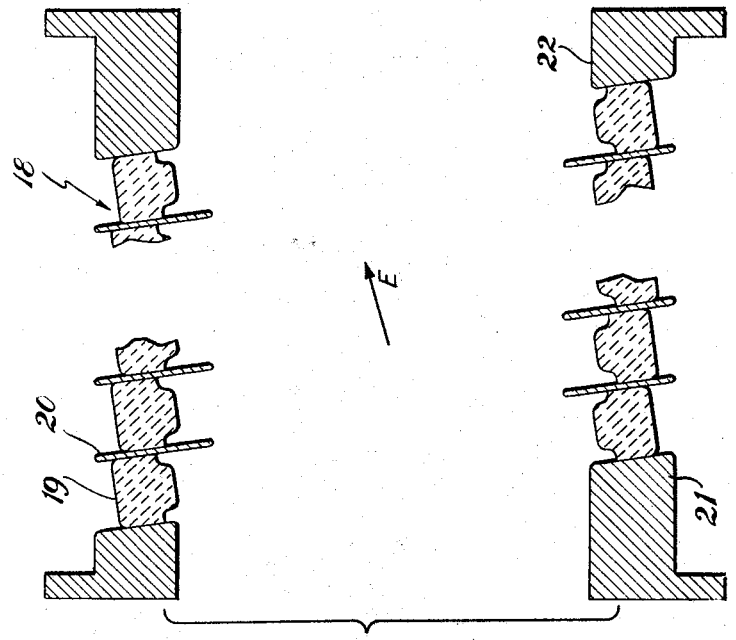
FIG. 7 is a view similar to that of FIG. 3 showing another modification of the vacuum tube of FIG. 3, in which the vacuum tube has flat electrodes.

Referring to the drawings and first to FIG. 1 thereof, the vacuum tube therein shown at 1 is constructed in accordance with the teachings of the prior art as reported, for example, in an article entitled "A New Design for a High-Voltage Discharge Tube" by L. C. Van Atta, R. J. Van de Graaff and H. A. Barton, appearing in the Physical Review at volume 43 page 158 (February 1, 1933). Said vacuum tube 1 comprises a tubular cylinder 2 of insulating material along the outer surface of which has been drawn a helical india ink line 3, which provides leakage resistance and imposes on the tube 1 a uniform potential gradient when a potential difference is applied across the ends of the tube 1, as indicated by the encircled plus and minus signs. As a result, an electric field is produced within the tube 1 as indicated by the arrows designed "E." The tube 1 terminates in suitable flanges 4, 5 of conductive material to which the ends of the helical line 3 are respectively connected.

If the tube 1 is evacuated sufficiently so that the mean free path of charged particles therein is greater than the length of the tube, then an ion pair 6 produced upon ionization of a gas molecule will separate into a positive and a negative part which will be accelerated to the negative and positive ends, respectively, of the tube 1, as indicated by the broken line. One of these parts will be accelerated to an energy corresponding to at least half the total voltage across the tube 1 and may be accelerated to energies up to that corresponding to the full voltage across the tube 1.

Referring now to FIG. 2, the vacuum tube therein shown at 1' may be considered as identical to that shown at 1 in FIG. 1, except that the helical line 3 of FIG. 1 has been squeezed to the left at the top of the tube as shown in the drawing and squeezed to the right at the bottom of the tube as shown in the drawing, so that the helical line 3' of FIG. 2 appears inclined to the vertical. In addition, wedge-shaped tubular conductive layers 7, 8 are interposed between the ends of the helical line 3' and the respective flanges 4', 5'.

An ion pair 6' produced upon ionization of a gas molecule will separate into a positive and a negative part neither of which can be accelerated to an energy greater than a fraction of the total voltage across the tube 1', as indicated by the broken line.

The distinction between the prior art tube 1 of FIG. 1 and the tube 1' of FIG. 2, constructed in accordance with the invention, may perhaps most readily be seen by noting that virtually all the lines of electric force pass through the tube 1 of FIG. 1, while no line of electric force passes through the tube 1' of FIG. 2. The lines of force are indicated by the arrows marked "E" in both FIG. 1 and FIG. 2.

Referring now to FIGS. 3 and 4, the vacuum tube therein shown at 9 is of generally tubular configuration and comprises a series of insulating rings 10 the lateral surfaces of each of which are metallized by any suitable technique, such as evaporation, so that a metal layer 11 is formed thereon. The metallized rings 10, 11 are bonded to one another by any suitable cement 12, such as an epoxy resin. In accordance with the invention the lateral surfaces of the rings 10, 11, although mutually parallel, are not perpendicular to the longitudinal axis of the tube. Consequently the metal layers 11 form equipotential planes which are not perpendicular to the axis of the tube, with the result that the electric field within the tube is in a non-axial direction, as indicated by the arrow in FIG. 3. A metal wedge-shaped flanged end-piece 13, 14 is cemented to each end of the stack of rings 10, 11, the wedge angle corresponding to the angle of the lateral surfaces of the rings 10, 11, so that the ends of the complete tube 9 are perpendicular to the axis of the tube 9 and suitable for mounting in the conventional way. A conducting ring 15 of generally circular cross-section may be inserted in grooves 16 which are formed in the outer circumference of the rings 10, 11 at the junctions therebetween, so as to be in electrical contact with the metal layers 11 which extend out into the grooves 16.

Referring now to FIGS. 5 and 6, the tube therein shown at 9' is similar to that shown at 9 in FIGS. 3 and 4, except that it comprises a series of rings 10' of conductive glass of high resistivity which are bonded together by any suitable cement 12'. A metal layer 17' in each groove 16' provides contact between neighboring glass rings 10' and a metal ring 15' of generally circular cross-section is inserted in each groove 16' upon the metal layer 17'. Metal wedge-shaped end-pieces 13', 14' are cemented to each end of the stack of rings 10', as in the case of the apparatus of FIGS. 3 and 4.

Figure 8:
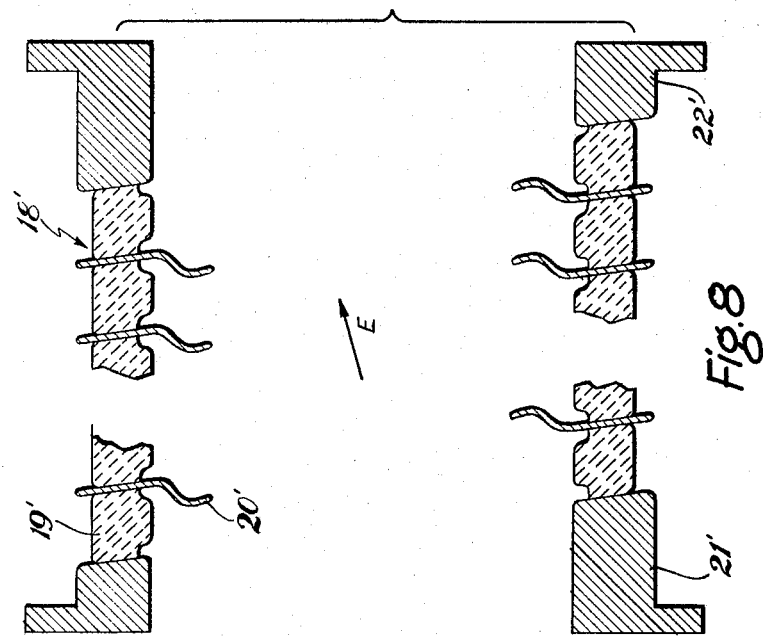
FIG. 8 is a view similar to that of FIG. 7 showing a modification of the vacuum tube of FIG. 7, in which the inclination of the electrodes is increased.

Referring now to FIG. 7, therein is shown a vacuum tube 18 generally similar to the vacuum tubes of the inclined field type previously described herein in that it comprises a multiplicity of insulating rings 19, but differing therefrom in that the insulating rings 19 are separated by apertured electrode disks 20. For simplicity in manufacture, the insulating rings 19 may be of conventional form, and the apertured electrode disks 20 may be flat, as shown in FIG. 7, but these are assembled in such a way as to be tilted with respect to the longitudinal axis of the tube 18 from a geometric point of view. Alternatively, the insulator rings may be made from a special mold so as to have the shape shown at 19' in FIG. 8. The use of special insulator rings of the type shown in FIG. 8 provides a vacuum tube which is stronger mechanically than that shown in FIG. 7, but the insulator rings 19 in the vacuum tube 18 of FIG. 7 may provide somewhat better electrical configuration.

In the case of the flat electrode tube shown in FIG. 7, an angle of tilt of 8° between the electrodes 20 and a plane perpendicular to the axis of the tube 18 may in general be sufficient. The vacuum tube of FIG. 7 terminates at each end in a wedge 21, 22, respectively, of a suitable conductive material such as, for example, steel, having an appropriate coupling means (not shown) for connection to the rest of the vacuum system.

If desired, the angle of tilt of the electric field may be still further increased by warping the electrodes 20 of the tube 18 shown in FIG. 7. The result is shown at 20' in FIG. 8 wherein an 8° tilt produced by such warping has been superimposed upon an 8° tilt in the unwarped electrode. With the device of the type shown in FIG. 8 the opening in the apertured electrode disks, 20', which is generally circular, can be of very large diameter. The devices shown in FIG. 7 and FIG. 8 are particularly useful for neutral beams or for differential pumping tubes. In either case, the orientation of the tilt may be the same, if desired, throughout the length of the vacuum tube.

Vacuum tubes of the type shown in FIGS. 2–8 are suitable for use as differential pumping tubes. As higher ion currents are produced in particle accelerators, larger quantities of gas may be released in the vacuum system from ion sources and charge-exchange regions, so that differential pumping tubes used in such particle accelerators must have very high pumping speeds. Vacuum tubes of the type shown in FIGS. 2 through 8 would have a very large aperture and hence a very high pumping speed, since each such tube is or approximates a long cylinder or pipe, for which the pumping speed is proportional to the diameter cubed. For example, in the case of air, the pumping speed through a long cylinder is equal to $12D^3/L$ liters per second where D is the diameter in centimeters and L the length in centimeters.

Vacuum tubes of the type shown in FIGS. 2–8 are also suitable for use as neutral beam tubes because of their large aperture and high pumping speed. A large-apertured tube may be needed even for a neutral-beam tube as these particles are formed by a positive ion beam whose space charge hinders the production of a compact neutral beam. The production and use of neutral beams are more fully described in my co-pending application, Serial No. 844,711.

The principles of the invention may be applied, not only to vacuum tubes for differential pumping and neutral beams, but also to vacuum tubes for the acceleration of charged particles. For this purpose, the vacuum tubes hereinbefore described may in general be modified by changing the orientation of the inclined field and by introducing barriers in the vicinity of the trajectory of the accelerated beam. In addition, certain precautions must be taken to ensure that the accelerated beam has the desired trajectory.

The application of the principles of the invention to acceleration tubes may perhaps most readily be understood by considering the following possible generalized procedure for constructing such a tube. First, consider a first main electrode and a second main electrode spaced therefrom in an evacuated region. Second, consider that a high voltage is applied between the two electrodes. Third, consider that a succession of spaced sheets of conductive material are distributed somewhat at random between the two electrodes at successive potentials, so that the potentials of the sheets varies step-wise from one main electrode to the second main electrode. Fourth, introduce a point source of charged particles at the first main electrode of polarity such that the charged particles, initially having negligible velocity, are attracted towards the second main electrode. The result of the fourth step will be that the charge particles are accelerated from the first main electrode to the sheet nearest thereto, and will make a mark on this sheet at the region of impact. Fifth, this marked sheet is removed, an aperture is formed therein at the region of impact slightly larger than the mark, and the apertured sheet is replaced. Sixth, steps four and five are repeated in succession for each of the sheets.

The resulting apparatus is one in which the accelerated beam travels the entire distance from one main electrode to the other, but no other particle can traverse more than a few sheets. This is because, assuming random distribution of the sheets, the apertures therein define a trajectory which is followed only by particles having a certain past history: namely, the past history of the charged particles in the accelerated beam.

It is not necessary that the sheets have a random distribution. It is sufficient if the sheets are so placed that electric charges in the immediate region of the beam trajectory are in general subjected to an electrical force in approximately the same direction and at a direction which is at an angle to the direction of the beam trajectory at that point. The sheet electrodes are not symmetric with respect to the beam trajectory, but the sheet electrodes are tipped with respect to the beam trajectory, so that the electric force on an electric particle (either in the beam or a secondary) is inclined to the direction of the beam trajectory at that point. If this is done, the only electrical particles that can go through more than a very limited number of holes will be those particles which are emitted from the desired source of electric particles and proceed along the trajectory to the second electrode. It may be noted that secondaries produced at or near a given point on the trajectory will not in general pass through many holes, as the holes have been so placed to allow the passage of trajectory particles and therefore will not in general allow the passage of particles which do not have suitable velocity and direction at that point (i.e. which do not have the previous history of the trajectory particles).

Various embodiments of the principles just enunciated will now be described.

For the sake of clarity, there is shown in FIG. 19 one type of particle accelerator having incorporated therein vacuum tubes embodying the invention. Referring thereto, a hollow electrode 100 is maintained at a high positive potential by transferring electric charge between said hollow electrode and ground by means of a charge-carrying belt 101 in accordance with well-known principles disclosed, for example, in U.S. Patent No. 1,991,236 and in Reports on Progress in Physics, Vol. XI, p. 1, (1948). Evacuated acceleration tubes 102 and 103 provide an evacuated region through which charged particles can travel between the hollow electrode 100 and ground; and gases released in the vicinity of the hollow electrode 100 may be removed through a differential pumping tube 104. Negative ions from a negative ion source 105 are injected into the grounded end of the first acceleration tube 102 and are accelerated to the hollow electrode 100 therethrough. A so-called stripper electrode 106 having a canal 107 to which gas is admitted from a gas supply 108 is mounted within the hollow electrode 100 so that the canal 107 is in the path of and therefore traversed by the negative ions, with the result that electrons are removed from at least some of the negative ions so as to form positive ions which are then accelerated away from the hollow electrode 100 through acceleration tube 103. Each vacuum tube 102–104 is maintained at a controlled potential along its length by being electrically connected to suitable points on a resistive path 109, 110 through which a small leakage current flows from the hollow electrode 100.

Figure 9:
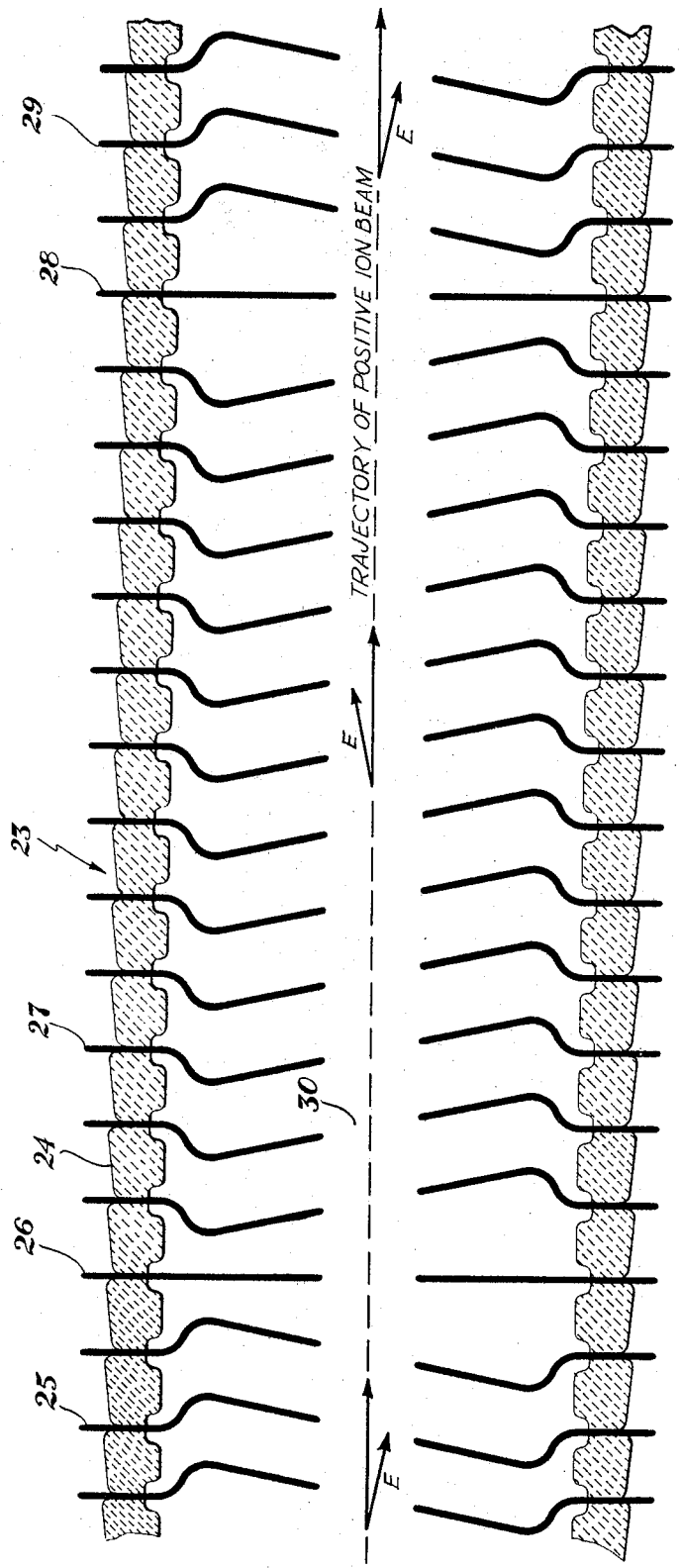
FIG. 9 is a longitudinal central section through an acceleration tube constructed in accordance with the invention.

Referring now to FIGS. 9–11, the acceleration tube therein shown at 23 consists of a multiplicity of alternating insulating rings 24 and apertured electrode disks 25–29 which are hermetically sealed to one another by any appropriate means such as, for example, by cementing. That portion of nearly all the electrode disks 25–29 which adjoins the central aperture 30 lies in a plane which is at an angle with respect to a plane perpendicular to the longitudinal axis of the acceleration tube 23, and in FIGS. 9–11 said angle is shown as being 12°. The effect of these electrodes 25–29 is to produce an electrostatic field within the acceleration tube 23 which is generally not parallel to the longitudinal axis of the tube 23 but is at an angle thereto; in the example shown in FIGS. 9–11 this angle is 12°.

Although the invention is not limited to vacuum tubes in which the electric field is uniform, it may be noted that, in the particular embodiment shown in FIGS. 9–11, the electric field, though inclined to the axis of the tube, remains generally uniform, so that electric lines of force are generally parallel with each other.

In the embodiment of the invention shown in FIGS. 9–11, unlike the embodiments of the invention shown in FIGS. 2–8, the electrode disks 25–29 are so constructed that the electrostatic field within the acceleration tube 23 is not in the same direction over the entire length of the long tube 23, but the angle of inclination with regard to the axis is reversed as certain lengths are reached. Thus the three outermost electrode disks 25, 29 at each extremity of FIG. 9 will produce an electric field which will exert a slightly downward force on a positive particle being accelerated from left to right in the tube 23, while the twelve central electrode disks 27 in FIG. 9 will produce an electric field which will exert a slightly upward force on such a charged particle. A flat electrode 26, 28 separates each group of similarly oriented electrode disks 25, 27, 29 from the group or groups adjacent to it. Charged particles in the primary beam which enter the tube 23 along its longitudinal axis with sufficient velocity can thus be caused to acquire the full kinetic energy available from the tube 23 and to leave the tube 23 along a path which deviates very slightly from its longitudinal axis. Secondary charged particles, on the other hand, have at their creation negligible initial velocity, and hence acquire kinetic energy whose direction is in general at an angle to the longitudinal axis of the tube 23 and whose magnitude is therefore limited by the transverse dimensions of the tube 23. For a tube 23 whose central aperture 30 is an inch and a half wide, the primary beam may be injected, for example, with an energy of one million electron volts. In certain cases, much lower injection energies are also feasible.

The deviation of the primary beam from the axis of the tube 23 is very slight. In one experiment, using a tandem-type electrostatic accelerator and a proton beam, a maximum amplitude of about one millimeter was obtained over a length of four thousand millimeters. This affords a striking example of how nearly straight the path of the accelerated particle beam can be under favorable conditions, even though at the same time secondaries were effectively removed by the accelerating electric field which was inclined to the axis.

Figure 12:
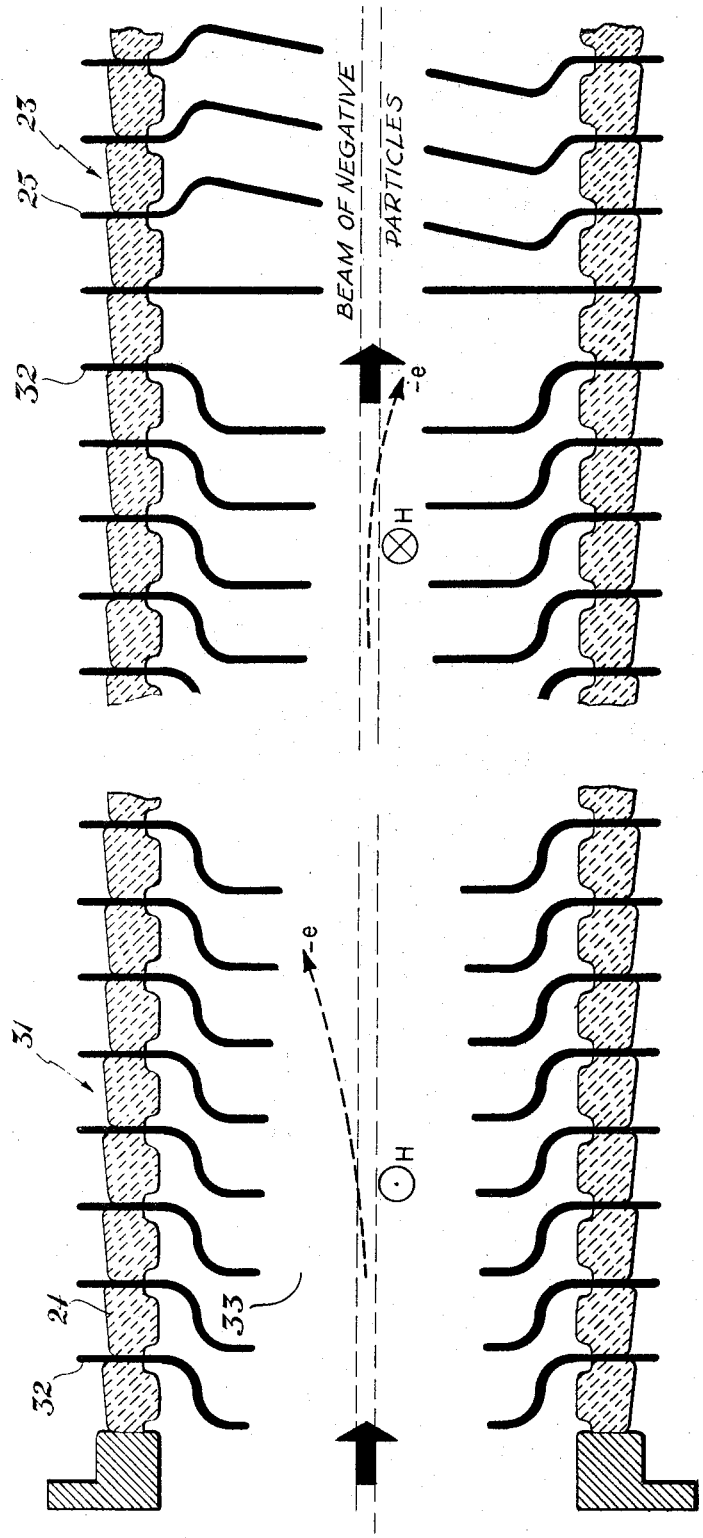
FIG. 12 is a view similar to that of FIG. 9 and showing that extremity of the acceleration tube of FIGS. 9 through 11 into which charged particles are injected, together with high-velocity injection apparatus.

Referring now to FIG. 12, therein is shown a suitable injector 31 for injecting charged particles into the inclined field tube 23 of FIGS. 9–11. The injector 31 is somewhat similar to the acceleration tube 23 of FIGS. 9–11 and comprises a multiplicity of alternating insulating rings 24 and apertured electrode disks 32. Unlike the electrode disks 25, 27, 29 of FIGS. 9–11, the electrode disks 32 of the injector 31 are perpendicular to the axis of the injector 31 in the vicinity of that axis, although the electrode disks 32 may be "dished," as shown, in accordance with certain teachings of the prior art hereinafter referred to. The injector 31 lies immediately adjacent to the main acceleration tube 23 of FIGS. 9–11 and may comprise an extension thereof, as shown in FIG. 12. The apertures 33 in the electrode disks 32 of the injector 31 change gradually, and preferably in equal increments, from a round aperture of 3½" diameter, at the end remote from the main acceleration tube 23, to a rectangular aperture 30 having a 1½" width at the end adjacent to the main acceleration tube 23. The total length of the injector 31 is about two feet and is designed to support a voltage of about one million volts. The injector 31 is provided with some magnets in accordance with the teachings of U.S. Patent No. 2,922,905 to Van de Graaff. Since the purpose and function as well as the construction of such magnets is fully disclosed in said U.S. Patent No. 2,922,905, it will not be disclosed in detail herein, except to note that several pairs of magnets (not shown) may be employed to produce two magnetic fields near the respective ends of the two foot length of the acceleration tube, said magnetic fields being approximately parallel but oppositely oriented as indicated by the circled dot and circled cross, each designed H, in FIG. 12. A suitable charged particle beam is injected into that end of the two foot injector 31 which is remote from the main acceleration tube 23. For example, a 40 kev. negative ion beam may be injected, as shown by the two heavy arrows and the double broken line in FIG. 12.

The main result of an inclined-field tube embodying the invention is achieved by putting in transverse components of the electrostatic field. Ideally, these transverse components would balance out completely insofar as the main charged particle beam is concerned, but in practice it may be more convenient to accomplish this with the aid of a beam-steering device. A beam-steering device permits one not only to get the balance as between the transverse components introduced but also permits one to direct the beam as desired as, for instance, onto the center of a canal, such as shown at 107 in FIG. 19, and which may have a quarter-inch diameter. Such a beam-steering device must satisfy requirements not present in nor satisfied by conventional beam-deflecting apparatus. It must act on the beam after the beam is focused so that the beam is "hard" at the time of deflection, and it must act on the beam before the end of the acceleration. In an oscillograph, for example, the deflection occurs after the acceleration, but in the present case the deflection must occur in the middle of the acceleration.

In accordance with the invention, a beam-steering device such as that shown in FIG. 13, may be employed. Referring first to FIG. 19, a representative tandem accelerator of the type therein shown will operate with a voltage of about 6 million volts on the hollow electrode 100, and the acceleration tube 102 may be divided into sections by a flanged cylinder 111 of about 10 inches in length. This flanged cylinder 111 has a suitable location and suitable dimensions for mounting a beam-steering device therein, because it is sufficiently remote from the injection-end of the acceleration tube 102 for proper beam stiffness and sufficiently remote from the canal 107, into which the beam must be directed, for adequate steering. A representative canal 107 would be five-sixteenths of an inch in diameter and approximately two feet long, so that very accurate steering is required. In order to get directional stability in addition to position stability, a conventional beam-deflecting device (not shown) may be inserted between the negative ion source 105 and the acceleration tube 102 to supplement the action of the beam-steering device in the cylinder 111. Thus one can deflect the beam at earth.

Referring now to FIG. 13, therein is shown the region between the two sections of the acceleration tube 102 of FIG. 19, including the cylinder 111 upon which is mounted a beam-steering device 34 embodying the invention. The resistive path 109 in general comprises series-connected resistors. Ideally the resistance of each of these resistors is accurate and unvarying, but in practice this will not be the case. In accordance with the beam-steering mechanism of the invention that portion of the total resistive path which lies between the cylinder 111 and the next adjacent electrode disk 35, 36 of each section of the acceleration tube 102 comprises a high voltage potentiometer 37 having a very high grade resistance. This potentiometer is connected between said electrode disks 35, 36 and the mid-point thereof is connected to the cylinder, which comprises the local ground, by a suitable lead 38. Within the cylinder 111 the path of the primary beam is flanked by at least one pair of electrostatic deflecting plates 39, 40, one 39 of which is connected electrically to the local ground and may therefore be mounted directly on the cylinder 111 by a conductive support 41, and the other 40 of which is electrically connected to a contact point 42 on the potentiometer 37, and may therefore be mounted on an insulating bushing, 43. The contact point 42 on the potentiometer 37 is mounted on a metal nut 44 which is prevented from rotating by a stop-bar 45 which passes through an unthreaded aperture in the nut 44. The nut 44 is mounted on a screw-threaded metal bolt 46 which is mounted on a metal bearing 47 to which the deflecting plate 40 is connected by a rigid metal connection 48. The metal bearing 47 is mounted on an insulating mount 49 and the bolt 46 is connected to and rotated by an insulating rod 50 which extends to earth. Thus the contact 42 on the potentiometer 37 is mechanically adjusted by rotation of the insulating rod 50, which may be controlled by an earthed selsyn motor (not shown). A sliding of the contact 42 along the whole length of the potentiometer 37 can make the beam move a distance greater than the aperture at the end of the tube 102. In the case of an inclined field acceleration tube, wherein the tilt of the electrodes is reversed along the length of the tube, the deviation thus introduced into the trajectory of the main charged particle beam will lie in one plane, and the pair of electrostatic deflecting plates should be so arranged as to provide deflection in this plane, as shown at 39, 40 in FIG. 13. In addition, if desired, a second pair of deflecting plates 51 arranged to provide deflection in a plane transverse to the first-mentioned plane may be provided, as shown in FIG. 13; one of these plates will be connected to the local ground while the other will be connected through an insulating bushing 52 to a second contact 53 on the potentiometer 37.

The compensation provided by this arrangement is automatic once it has been initially adjusted. It will remain the same despite changes in voltage on the hollow electrode 100 and despite changes in the type of particle which is being accelerated. This would not be true of a magnetic deflection arrangement. It is true in this case because the entire arrangement is essentially electrostatic. That is to say, the same thing that is accelerating the charged particles is also providing the transverse movement.

In addition to its use in connection with the inclined field tube of the invention, the beam-steering mechanism of the invention will also be useful in conventional acceleration tubes for the purpose of steering the charged-particle beam from the middle of the acceleration tube for accurate directing of the charged particle beam onto the target area. In such an application, one would again obtain the compensation for changes in terminal voltage. In such an application, it would in general be desirable to use the double pair of deflector plates, since in this use the deviations would not tend to be predominately in one plane. In the case of the inclined-field tube, the central aperture 30 in the electrode disks 25–29 (FIGS. 9–11) is relatively wide in one plane and hence gives plenty of room for adjustment in that plane at earth potential, so that the second pair of deflection plates may not be necessary.

The novelty of the beam-steering device of the invention resides in the following factors. In the first place it is automatic: it provides automatic compensation for error, and in addition provides direction into a tiny orifice. In the second place, in the case of the conventional particle accelerator, steering occurs at a point remote form the end of the tube, in the middle of the acceleration. The beam steering device of the invention needs no power supply and indeed is better than one having a power supply because it provides automatic adjustment.

The acceleration tube shown in FIG. 14 differs from that shown in FIGS. 9–11 in that the electrode disks 25'–29' of FIG. 14 are "dished," as shown, to provide shielding of the insulating rings 24'. This dishing of the electrode disks 25'–29' forms no part of the invention, but is a technique which had been found to be desirable in certain acceleration tubes of prior art construction. It is believed that the advantages of the present invention are such that there will be less demand for this dishing technique with acceleration tubes construced in accordance with the invention.

The tube shown in FIG. 14 is similar to the embodiment of the invention which was first constructed and tested and differs from a standard dished-electrode tube mainly in that the central region of its electrodes 25'–29' has been given a deformation or tipping which caused the electric field near the central axis of the tube 23' to be changed from its previous condition (which was a uniform field parallel to the axis of the tube) to its new condition, which is that of a uniform field inclined at an angle of eight degrees to the axis. In order to afford a definite basis of comparison the tests in general were first made with a dished-electrode tube of standard design and immediately afterward similar tests were made with an inclined-field tube of the general type shown in FIG. 14. The work was divided into three groups of tests. In the first group a beam of neutral particles (hydrogen atoms) was injected at a particle energy corresponding to 40 kev. into the grounded end of the new inclined-field tube whose other end was connected to a high-voltage terminal having a positive potential variable up to 6 million volts. It should be noted that in the discussion below the intensities of the neutral beams are given in terms of microamperes, that is to say, the number of microamperes that would be carried by a proton beam composed of an equivalent number of particles per second.

For these neutral beam experiments the configuration of the electrodes was tilted like that in FIG. 14, but the orientation of the electrodes was such that the inclined field was everywhere in the same direction, and without the reversals shown in FIG. 14. The following characteristics were observed:

(1) Greatly improved speed of voltage conditioning. Typically, voltage conditioning of a standard acceleration tube to 6 million volts may take 3 weeks or more; whereas the inclined-field tube tested at all times immediately insulated the voltage applied to it by the generator.

(2) A complete absence of tube sparks. Although heavy tube sparks were encountered many times during test of the standard tube even at very low terminal voltages when high-current neutral beams were injected, no tube sparks were observed with the inclined-field tube in a total of 40 hours of actual tests under all operating conditions.

(3) Extremely little radiation in the vicinity of the apparatus at all terminal voltages. With the injection of a neutral beam of intensity corresponding to 100 microamperes the radiation background outside the tank in the case of the standard tube was quite high. When the inclined field tube was substituted this background dropped by a factor of many thousands.

(4) An elimination of regenerative tube loading caused by the injection of the neutral beam. In one test, electric charging current was delivered to the high-voltage terminal at a rate sufficient to raise its potential to 5.8 million volts; then, without changing this charging current, the neutral beam was admitted and its current increased. In the case of the standard tube, increasing the beam current first to 5 microamperes and then to 70 microamperes caused the terminal voltage to drop to 4 million volts and 1.5 million volts respectively, whereas in the case of the inclined-field tube the terminal voltage did not drop below 5 million volts even when the beam current was increased to over 90 microamperes. In another test the beam intensity was kept constant and the terminal voltage was raised by increasing the electric charging current delivered thereto. Using the standard tubes with high current injected neutral beams the terminal voltage could not be raised above 3 million volts. Each run was terminated by a tube spark. On the other hand, when the inclined-field tube was in use the increase in termnial voltage was approximately linear with increased charging current, for all neutral beam intensities.

(5) In both the experiments with the standard tube and with the inclined field tube a scintillation counter was used to observe the X-ray spectra produced under various conditions of operation. In the case of the standard tube tested, the maximum photon energy observed always showed that there was electron acceleration along the full length of the acceleration tube. In the case of the inclined field tube, the maximum photon energy observed did not exceed a quantum of 1 mev. even at a terminal voltage of 5 million volts. This result showed that the inclined field eliminated electrons from the tube before they had traversed a distance corresponding to less than 1 mev.

In the vacuum tube of this group of tests the electric field was directed along lines which were at an angle of 8° to the longitudinal axis of the tube. The inside diameter of the apertured electrode disks was one inch and the axial pitch between the apertured electrode disks was also one inch. The voltage between the apertured electrode disks was 40 kv. The longest electric line of force is one which just grazes the inner edge of two apertured electrode disks, and the voltage drop along such a line of force is that which exists between the two apertured electrode disks which are situated next beyond the two apertured electrode disks whose inner edge is grazed by the line of force. This voltage drop was therefore equal to $$\frac{40 \text{ kv. per inch} \times 1 \text{ inch}}{\tan 8°} + 80 \text{ kv.} = 365 \text{ kv.}$$

All charged particles formed within the tube have zero kinetic energy to start with, and so in general no secondary charged particle can acquire more kinetic energy than that equivalent to 365 kilovolts, irrespective of the length of the tube. The experimental results given in the paragraph above are consistent with these calculations.

For the second group of tests, the tube was taken apart and rebuilt with reversal of field inclination as shown in FIG. 14, thus making it available for tests of the acceleration of charged particles. For these tests the tube was installed as the high-energy tube of the tandem accelerator, and it was found that the tube worked well under these conditions for the acceleration of proton beams.

The third group of tests was similar to the first group, except that an inclined-field acceleration tube having alternate reversals of inclination orientation was used. Observations of the X-ray spectra made with the scintillation counter again showed that with the inclined-field tube the electron paths were limited as calculated to only a certain fraction of the length of the tube, thus again showing that the total voltage effect had been eliminated.

The results of the tests hereinbefore mentioned give strong evidence that one can test short lengths of an acceleration tube and then extrapolate the results for the design of long acceleration tubes. This is advantageous because long acceleration tubes must be tested in a large high-voltage accelerator, such as the tandem accelerator shown in FIG. 19, which is an elaborate and costly piece of apparatus. Moreover, much of the limited amount of time available on a large high-voltage accelerator for testing must be used to analyze problems which are related to the voltage generator itself. In the above-mentioned tests with the inclined tube the performance of the big tandem accelerator on which the tubes were tested was never limited by the tube; the limitations encountered were those due to the generator or other parts of the apparatus. Consequently tubes of very high voltage can now be made by making them longer. Since the voltage of the tube is now independent of the total voltage effect, it becomes proportional to the length. Based on a study of the performance of various actual tubes, it has been previously suggested by one author that the voltage (V) applied to tubes increased with length (L) according to an empirical law that L was proportional to $V^{3/2}$. In the inclined-field tube of the invention L is proportional to V; and V equals $L \cdot E$. Thus by studying a short tube one can predict the performance of a long tube. Since short tubes can be conveniently and effectively studied in a relatively small test apparatus, the fact that one can extrapolate the performance of the inclined-field tube of the invention makes it more desirable to do development work to increase the value of E.

As hereinbefore indicated, the inclined-field tube of the invention makes "dished" electrode techniques unnecessary. Consequently, such inclined-field tubes are reversible in polarity. Dished electrode tubes are not reversible in polarity, that is to say, they do not work as well when the polarity is reversed. Tubes without dished electrodes can operate with the high voltage terminal at either polarity, whereas tubes with dished electrodes operate best only when the electric field is in a single direction.

As indicated by the tests hereinbefore mentioned, background radiation has been reduced. This results in reduced radiation hazard, reduced radiation damage to sensitive parts of the apparatus, and greater accuracy in measurement of experimental results.

A further result of having eliminated the total voltage effect is that one need not be so carefully as heretofore in the manufacture of acceleration tubes. For example, the electrodes may be very thin, and, as indicated in the apparatus of FIGS. 9–11, large diameter apertures may now be employed which will greatly assist in increasing pumping speed for the maintenance of the vacuum within the evacuated tube. The fact that tubes can be made with less demanding workmanship and hence constructed more cheaply is particularly advantageous in the manufacture of acceleration tubes for electron processing. Since in accordance with the invention beam loading is prevented by the use of inclined fields, which remove the secondaries immediately upon formation, in certain other respects the tube construction can be less careful and expensive than is now necessary. For example, these tubes can operate at vacuums much poorer (i.e. higher gas pressures) than those required by the conventional design of high-voltage vacuum tubes. Moreover, the quality of materials and surface finish on the electrodes can be much less exacting.

Embodiments other than those shown in the drawings may, of course, be employed. As an example, the orientation of the electrodes can be changed along the tube so that the angle of inclination of the electric field lies in different planes in different portions of the tube rather than in a single plane (with or without reversals) as in the tubes described hereinbefore. The plane in which the angle of inclination lies might rotate about the axis of the tube in successive portions thereof, or a more random variation might be adopted, all without departing from the spirit and scope of the invention.

In the acceleration tubes described in FIGS. 9 through 14 it has been indicated that the charged-particle beam being accelerated has been injected into the inclined field portion of the acceleration tube at relatively high energy: for example, at an energy of 1 mev.; and in FIG. 12 there is shown a suitable injection device for accomplishing this objective of high energy injection. However, it is also possible in accordance with the invention to utilize an inclined field acceleration tube even with a charged particle beam which has been injected into it at relatively low velocity or indeed at no velocity at all. Low velocity injection may be accomplished with either positive ions or negative ions or electrons. However, since low velocity injection is most readily accomplished with an electron beam, it will not be described with particular reference to an electron beam, although it is to be understood that the scope of the invention is not limited thereto, but also includes the low velocity injection of positive or negative ion beams. Of course, in the case of neutral beams, there is no particular problem associated with the injection thereof into the inclined field tube of the invention.

Referring now to FIG. 15, the evacuated acceleration tube therein shown at 54 is quite similar to that shown and previously described with reference to FIGS. 9 through 11 except that the orientation of inclination of the electrodes is reversed at relatively short intervals in the vicinity of the source of charged particles. Thus the tube 54 comprises a multiplicity of insulating rings 55 alternating with apertured electrodes some of which are inclined so that the electric field is directed to the left and downward as in the case of the electrodes 56, others of which are inclined so that the electric field is directed upwards and to the left as in the case of the electrodes 57, and the remaining electrodes being perpendicular to the axis of the tube as in the case of the electrodes shown at 58. The tube 54 terminates in a cap 59 of conductive material which is affixed to a flat electrode 58 at the injection end of the tube 54. This flat electrode 58 and the cap 59 forms a field-free region in which may be mounted, in any conventional manner, an electron gun 60 of conventional design which is therefore capable of providing an accurate electron beam, concentrated and small, of as much as 30 kv. This electron beam 61 is ejected out of the field free region bounded by the cap 59 and the flat electrode 58 and into the inclined field portion of the acceleration tube 54, not along the longitudinal axis of the tube 54 but at an angle thereto. Moreover, this injection takes place not at a point on the longitudinal axis of the tube 54 but at a point which is displaced therefrom and the angle of injection is such that the electron beam 61 is initially directed towards the axis of the tube 54. The trajectory of the electron beam 61 may be calculated with precision, and the apertures in the electrodes 56 at the injection end of the tube 54 are reduced in accordance with the invention as much as convenient without obstructing the passage of the electron beam 61; for example, the aperture size may be one quarter of an inch. It is because the apertures at the injection end of the tube 54 are small that it is possible to have closely spaced reversals of orientation of the electric field, since the interval between reversals of the electric field need only be great enough to permit the removal of secondaries. If the apertures are large, one can't reverse the orientation of the electric field too often because otherwise the secondaries would not have sufficient time to reach the electrodes of the tube. Because of the frequent reversals of orientation of the electric field which the use of small apertures permits, it is not necessary that the charged particles be injected with much energy. However, because positive ions are more difficult to work with, low velocity injection is more suitable with electrons, which can be accurately controlled. Space charge effects in a positive ion beam are less controllable and so a larger aperture in the tube is required. Similar considerations apply to a negative ion beam and even to a neutral beam because the neutral beam is formed by a positive ion beam in which space charge effects may have taken place at low beam energy where such effects are largest.

The principles involved in low velocity injection may be extended even beyond the device shown in FIG. 15. For example, the required injection velocity may be obtained from the tube itself, thereby eliminating the need for the electron gun 60 in FIG. 15. Referring now to FIG. 16, therein is shown an acceleration tube 62 which is similar to the acceleration tube 54 of FIG. 15 except that the electron gun 60 and the initial flat electrode 58 have been eliminated and the electrons are released at a narrow aperture 63 in the first electrode 64 which is inclined as shown. The next few electrodes 65 are inclined at the same angle and in the same direction as the angle of inclination of the first electrode 64 so that the electrons which are emitted at the aperture 63 from a suitable filament 66 are initially accelerated in a straight line. The filament 66 is heated in the usual manner by means of an electric current which is supplied thereto through the leads 67, 68 which pass through the insulators 69, 70 respectively extending through the cap 71 of conductive material which is affixed to the first electrode 64. As in the case of the apparatus shown in FIG. 15, in the apparatus of FIG. 16 the first few electrodes 64, 65 are followed by a second group of electrodes 72 which are inclined in the reverse direction from that in which the first group of electrodes 64, 65 are inclined, and the second group of electrodes 72 is separated from the first group of electrodes 64, 65 by a flat electrode 73. All the electrodes 64, 65, 72, 73 are separated from one another by insulating rings 74. In the apparatus of FIG. 16 therefore the electrons being accelerated in the beam 75 commence their trajectory with negligible velocity at a point off the axis of the tube 62 and in a direction which is inclined towards the axis of the tube 62.

Still another embodiment is shown in FIGS. 17 and 18. The embodiment shown in FIGS. 17 and 18 is quite similar to that shown in FIG. 16 except that the electrons commence their trajectory in a curved electric field. This has the important result that secondaries released by the electron beam, even fairly near the electron source, are not able to bombard the filament. Since bombardment of the filament by secondaries is a cause of cathode failure, the embodiment of the invention shown in FIGS. 17 and 18 has a real advantage. In the embodiment shown in FIGS. 17 and 18 even near the electron emitting filament there is an angle between the electron beam trajectory and the electric field at a given point, thus causing secondary positive ions produced at such a point on the axis of the beam trajectory to be accelerated along a path gradually diverging from the beam trajectory and thus tending not to bombarded the electron filament but rather the metal guard ring plate around it. This is due to the fact that the electrons are emitted into an electric field having curved lines of force. This eliminates bombardment of the electron filament by returning high energy positive ions whereas in a conventional tube the electron filament is bombarded by positive ions having energy up to those having the full voltage of the acceleration tube.

Referring more particularly to the detail of FIG. 18, the lines of force 76 extending from the cathode guard ring 77 to the first electrode 78 are curved so as to follow a circular path whereas the lines of force 79 extending from the first electrode 78 to the second electrode 80 are straight lines. In the region where the lines of force 76 are curved any charged particle starting from zero velocity will initially follow one of the circular lines of force but due to centrifugal force such a particle will tend to move outward from this circular line of force as it gains velocity. As a result, the electron trajectory 81 starts along a circular line of force 76 but soon begins to swing outside of the circle. As it enters the region between the first electrode 78 and the second electrode 80 wherein the lines of force 79 are straight the electron trajectory 81 will begin to flatten out so that, although it will not follow a straight line of force 79, it will gradually come more and more into line with a straight line of force 79.

Since the straight lines of force 79 are inclined to the axis of the tube, it is clear that any positive ion created in that region will tend to acquire a velocity in such a direction as to miss the filament 66'. However, because the lines of force 76 are curved, positive ions which are created even in this region (except very close to the filament) will also miss the filament 66'. The trajectory of one such positive ion is shown at 82 in FIG. 18. Since it starts with negligible velocity it too will initially follow a circular line of force 76 but as it acquires velocity, it will soon tend to swing outside of this circle. Due to the centrifugal force of the electrons in the main beam 81 this positive ion trajectory 82 begins on a circle which does not pass through the filament 66' but will pass somewhat below it, so that the centrifugal force of the positive ions in the trajectory 82 will further augment this displacement so that the positive ion strikes the guard ring 77 well below the filament 66'.

The reduction or elimination of regenerative loading and other total voltage effects becomes extremely important when the production of particle beams of much higher power is desired. A rapid increase is to be expected in the needs for such high current beams both for scientific and for industial purposes. It is believed that vacuum tubes using the inclined field pinciple herein described will make feasible the acceleration of even the most intense particle beams, right up to the maximum amount of power that can be supplied from new and more powerful electromagnetic sources of high voltage. Examples of such constant potential high voltage power sources have been described and claimed in my two co-pending applications, Serial No. 647,915, filed March 22, 1957, and now abandoned and Serial No. 39,539, filed June 29, 1960, now Patent No. 3,239,702. In one such example, power is produced by electromagnetic transformer action and in another example, power is produced mechanically by electromagnetic generator action.

It can be seen from FIGURE 19 that in the case of a particle accelerator the high voltage generator is usually placed in an insulating medium. In the usual high voltage generator this insulating medium is an insulating gas under pressure which is enclosed within a tank. However, it may be desirable to use vacuum insulation for this purpose in which event the tank would be evacuated. In this event the insulating rings of the acceleration tube would not need to serve the function of providing a vacuum enclosure but would only need to serve the function of providing mechanical support for the apertured electrode disks, and the tank would serve the function of providing the evacuated enclosure. It is clearly to be understood that a structure such as that just described is within the scope of the following claims.

Having thus described the principles of the invention, together with several illustrative embodiment thereof, it is to be understood that, although specific terms are em- ployed, they are used in a generic and descriptive sense and not for purposes of limitation, the scope of the invention being set forth in the following claims.

I claim:

1. An elongated high-voltage vacuum tube having a longitudinal passageway therethrough and means for producing an electric field generally inclined with respect to said passageway, so that the length of the longest line of electric force within the insulating portion of the tube is less than the length of the insulating portion of the tube, said tube including a multiplicity of alternating rings of insulating material and apertured electrode disks, said electrode disks being inclined with respect to a plane perpendicular to said passageway.

2. An elongated high-voltage vacuum tube having a longitudinal passageway therethrough and comprising a multiplicity of alternating insulating rings and electrode disks having apertures so as to define said passageway each of said electrode disks being bounded by flat conducting material and having lateral surfaces which are generally inclined with respect to a plane perpendicular to said passageway.

3. An elongated high-voltage acceleration tube comprising an evacuated enclosure, a multiplicity of apertured electrodes axially spaced along the length of said tube, means for distributing the high voltage applied to said tube among said electrodes, whereby said electrodes define an electric field configuration within said tube, means for releasing charged particles at one end of said tube within said electric field configuration, the apertures in said electrodes being located along the trajectory of said charged particles as they are accelerated by said electric field configuration, said electrodes being not symmetric with respect to said trajectory, but said electrodes being tipped with respect to said trajectory so that the electric force on an electric particle, either beam or secondary particle, is inclined to the direction of said trajectory at that point.

4. An elongated high-voltage acceleration tubing comprising an evacuated enclosure, a multiplicity of apertured conductive barriers aligned along the length of said tube so that the apertures form a passageway, means for distributing the high-voltage applied to said tube among said barriers, and means for directing a charged-particle beam along said passageway on a trajectory which is inclined with respect to the electric field substantially throughout its length, said apertures being sufficiently small so that secondary charged particles are intercepted by said barriers.

5. An elongated high-voltage acceleration tube comprising an evacuated enclosure, a multiplicity of barriers axially spaced along the length of said tube, means for distributing the high voltage applied to said tube along its length so as to produce an electric field configuration within said tube, means for releasing charged particles within said electric field configuration, whereby said charged particles are accelerated by said field as a beam along a trajectory, said electric field configuration being such that the electric field at points on said trajectory is generally inclined thereto, said barriers being sufficiently close to said trajectory so as to allow said beam to pass but to limit the passage of secondary charged particles through the barriers to only a few barriers.

6. Apparatus for accelerating charged particles comprising in combination, a source of high voltage, a first electrode and a second electrode connected across said source, means defining an evacuated region therebetween means for emitting charged particles at said first electrode, a succession of apertured metal sheets spaced between said first electrode and said second electrode at successive potentials, successive apertures each being so placed that particles emitted from said first electrode are allowed to pass through it in a trajectory to said second electrode, the intermediate sheets being so placed that electrically charged particles in the immediate region of the particle trajectory are in general subjected to an electrical force in approximately the same direction which is at an angle to the direction of the beam trajectory at that point.

7. An elongated high-voltage acceleration tube having a longitudinal passageway therethrough and comprising a plurality of sections each comprising a multiplicity of alternating insulating rings and electrode disks having apertures bounded by flat conducting material whose lateral surfaces are mutually parallel and inclined with respect to a plane perpendicular to said passageway, the direction of orientation being reversed between adjacent sections, said apertures being aligned so as to define said passageway.

8. Apparatus according to claim 7, wherein the length of said sections progressively decreases towards one extremity of the tube.

9. Apparatus according to claim 8, including means for releasing charged particles at said extremity of the tube between two non-parallel electrode disks.

10. An elongated high-voltage acceleration tube having a longitudinal passageway therethrough and comprising a plurality of sections each comprising a multiplicity of alternating insulating rings and electrode disks having apertures bounded by flat conducting material whose lateral surfaces are mutually parallel and inclined with respect to a plane perpendicular to said passageway, the direction of orinetation being reversed between adjacent sections, said apertures being aligned so as to define said passageway, and means for injecting charged particles into said tube with non-axial kinetic energy.

11. An elongated high-voltage acceleration tube having a longitudinal passageway therethrough and comprising a plurality of sections each comprising a multiplicity of alternating insulating rings and electrode disks having apertures bounded by flat conducting material whose lateral surfaces are mutually parallel and inclined with respect to a plane perpendicular to said passageway, the direction of orientation being reversed between adjacent sections, said apertures being aligned so as to define said passageway, and means for releasing charged particles in said tube at a point such that secondary charged particles in general will have a rather short path of acceleration in the tube and that only those quite near the point of emission will be accelerated to it, said apertures near the point of emission being of reduced diameter so as to delineate the beam trajectory.

12. An elongated high-voltage acceleration tube having a longitudinal passageway therethrough and comprising a plurality of sections each comprising a multiplicity of alternating insulating rings and electrode disks having apertures bounded by flat conducting material whose lateral surfaces are mutually parallel and inclined with respect to a plane perpendicular to said passageway, the direction of orientation being reversed between adjacent sections, said apertures being aligned so as to define said passageway, and means for injecting ions into said tube, said injection means including an evacuated acceleration tube and means for producing a magnetic field configuration therein transverse to the beam trajectory therethrough.

13. An elongated high-voltage acceleration tube having a longitudinal passageway therethrough and comprising a plurality of sections each comprising a multiplicity of alternating insulating rings and electrode disks having apertures bounded by flat conducting material whose lateral surfaces are mutually parallel and inclined with respect to a plane perpendicular to said passageway, the direction of orientation being reversed between adjacent sections, said apertures being aligned so as to define said passageway and means for injecting electrons into said tube off the axis thereof and with non-axial kinetic energy.

14. An elongated high-voltage acceleration tube having a longitudinal passageway therethrough and comprising a plurality of sections each comprising a multiplicity of alternating insulating rings and electrode disks having apertures bounded by flat conducting material whose lateral surfaces are mutually parallel and inclined with respect to a plane perpendicular to said passageway, the direction of orientation being reversed between adjacent sections, said apertures being aligned so as to define said passageway and means for injecting electrons into said tube of the axis thereof and with non-axial kinetic energy, said apertures near the point of injection being of reduced diameter so as to delineate the beam trajectory.

References Cited by the Examiner

UNITED STATES PATENTS

| | | | |
|---|---|---|---|
| 2,235,497 | 3/1941 | Heil | 328—256 X |
| 2,407,905 | 9/1946 | Rose | 178—7.2 |
| 2,460,609 | 2/1949 | Torsch | 250—162 |
| 2,501,882 | 3/1950 | Trump et al. | 313—63 |
| 2,578,908 | 12/1951 | Turner | 313—64 X |
| 2,714,679 | 8/1955 | Van de Graaff | 313—230 X |
| 2,820,142 | 1/1958 | Kelleher | 313—63 X |
| 3,036,233 | 5/1962 | Petrie et al. | 313—63 X |
| 3,175,120 | 3/1965 | Wendt | 313—106 X |

JAMES W. LAWRENCE, *Primary Examiner.*

RALPH G. NILSON, GEORGE N. WESTBY,

*Examiners.*

C. R. CAMPBELL, P. C. DEMEO, *Assistant Examiners.*